Patented May 5, 1925.

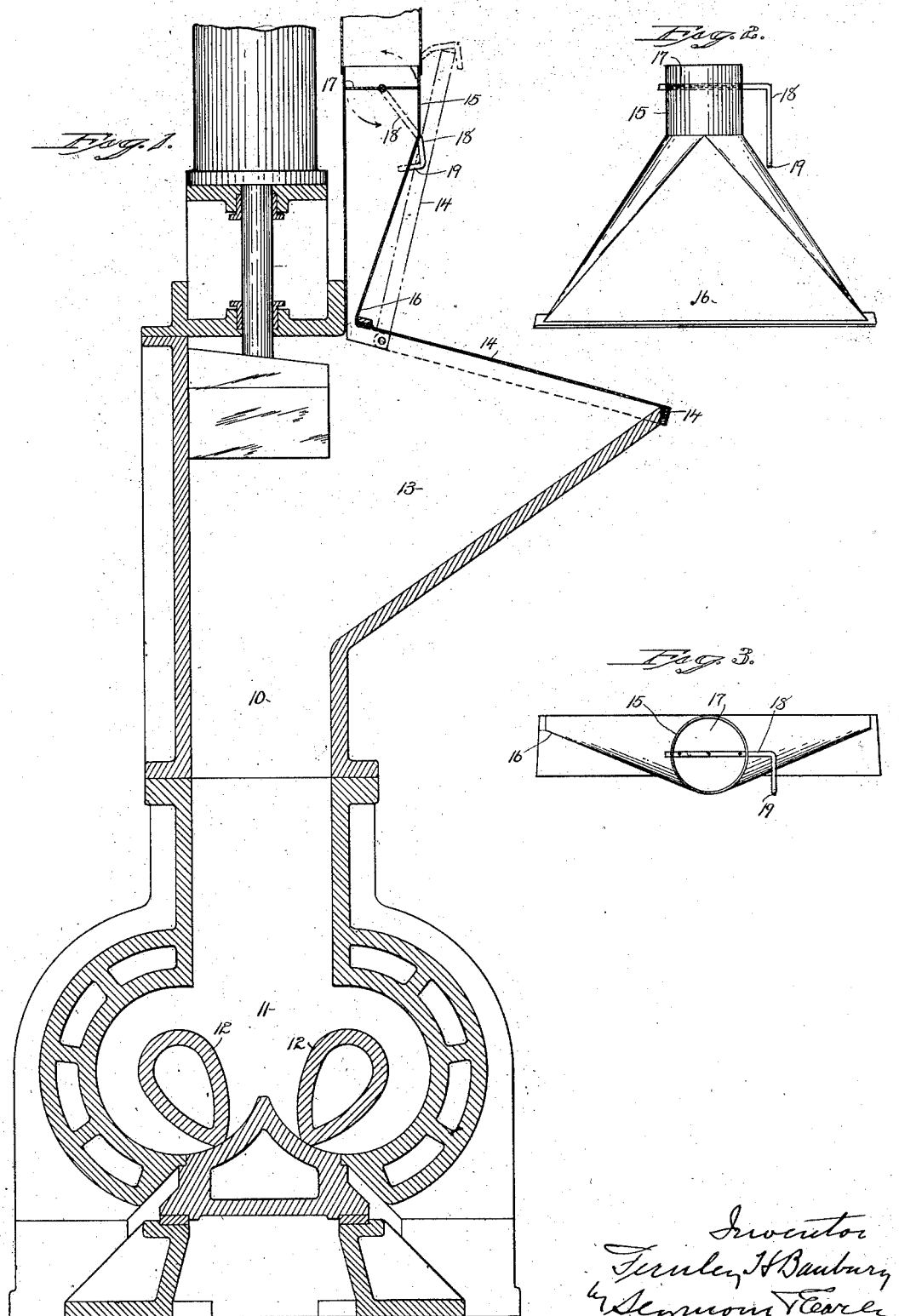

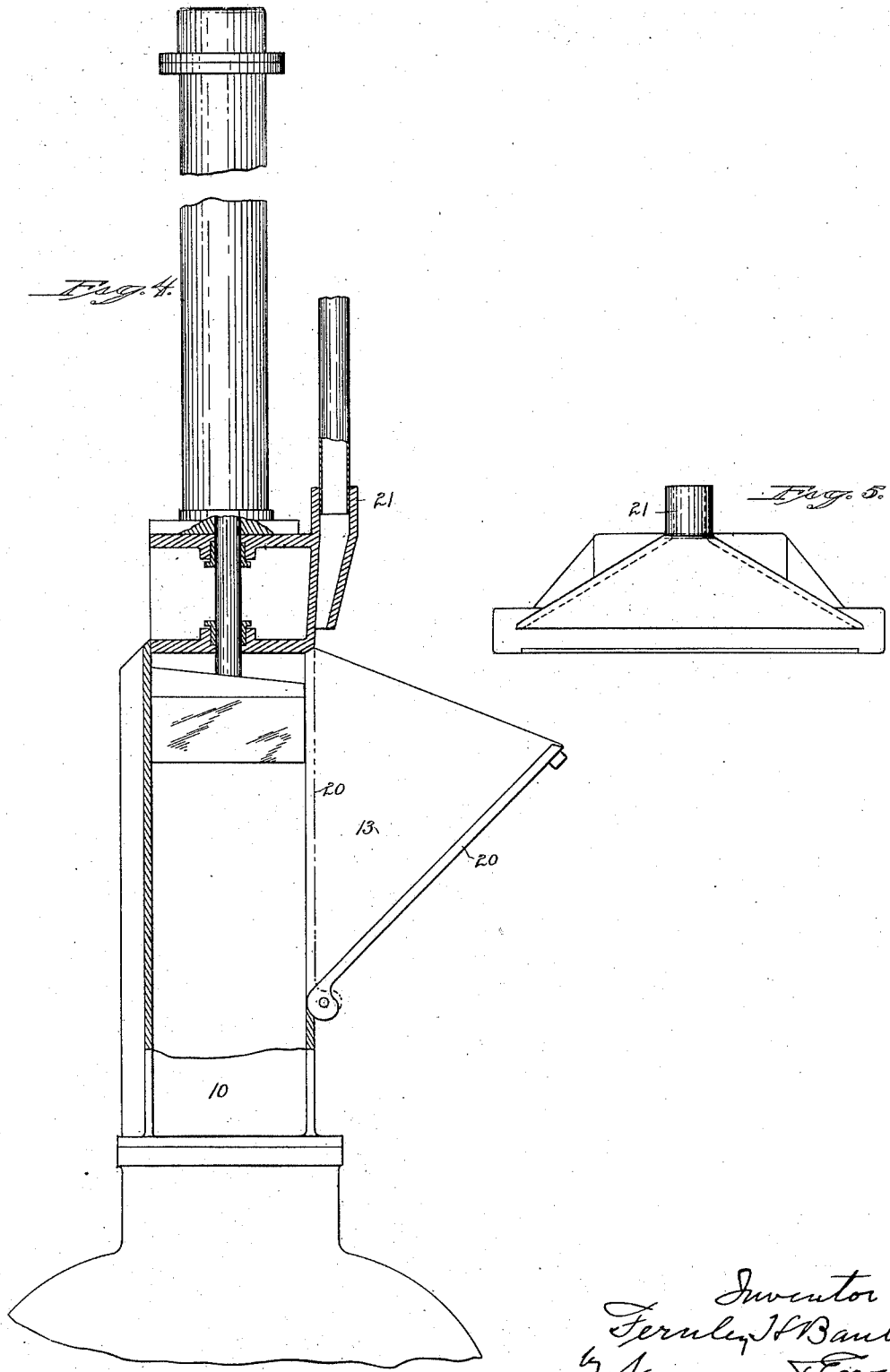

1,536,466

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

Application filed September 13, 1922. Serial No. 587,926.

*To all whom it may concern:*

Be it known that I, FERNLEY H. BANBURY, a citizen of the United States, residing at Ansonia, in the county of New Haven and State of Connecticut, have invented a new and useful Improvement in Machines for Treating Rubber and Other Heavy Plastic Material; and I do hereby declare the following, when taken in connection with the accompanying drawings and the characters of reference marked thereon, to be a full, clear, and exact description of the same, and which said drawings constitute part of this application, and represent, in—

Fig. 1 a vertical sectional view of a mixing machine, illustrating one form of my invention.

Fig. 2 a side view of the suction pipe.

Fig. 3 a plan view of the same.

Fig. 4 a side view partly in section showing the application of my invention to another form of mixer.

Fig. 5 a side view of the suction pipe.

This invention relates to an improvement in machines for mixing rubber and other heavy plastic material. In mixing rubber certain powders, many of which are light and easily make dust, are introduced during the process and sometimes volatile poisonous liquids are used. It is also desirable from time to time to open the machine to examine the condition of the mixture. If the machine be opened while the powders or liquid are partially free the dust or vapor will escape into the room and possibly into the face of the operator, making it not only unpleasant but possibly dangerous. The object of this invention is to provide a suction pipe opening out of the machine so that before or at the time the machine is opened a draft may be produced which will prevent the dust or vapor from entering the room in which the machine is located and the invention consists in the construction and arrangement of parts as hereinafter described and particularly recited in the claims.

In Fig. 1 of the drawings I have illustrated a machine like that shown in U. S. Patent 1,279,220, in which a neck 10 of the machine opens into the top of a mixing chamber 11 in which the usual rotors 12 are mounted, opening into the neck is a hopper 13 provided with a hinged cover 14. Above the hopper is a suction pipe 15 connected with suitable suction mechanism. The lower flaring long, narrow end 16 of the pipe opens into the hopper in rear of the rear edge of the cover 14. In the pipe is a damper 17 provided with an operating lever 18 having a hook 19 at its outer end to engage with the outer edge of the cover 14 when the cover is raised. Normally the damper will stand horizontally so as to close the suction pipe 15 and before opening the cover the operator turns the damper by raising the lever 18 and then when the cover is raised it may be engaged by the hook 19 so that the cover is held open and at the same time the damper is also held open. The weight of the operating-lever 18 is sufficient to automatically close the damper when released from the cover. With suction through the pipe 15 all dust and vapor which might rise, due to the rotation of the rotors, will be drawn into the pipe and not escape into the room, thus making it more pleasant and healthier for the operator.

In Fig. 4 of the drawings I illustrate another form of mixing machine like that shown in Patent No. 1,279,824. One side of the neck is provided with a hinged door 20 which when open forms a chute for loading the chamber. In this construction I mount a suction pipe 21 with its lower flaring open end above the upper edge of the door 20 and so that when the door is opened dust or vapor rising from the chamber will be drawn off so as not to escape into the room. It will be understood that in both cases, when the cover is closed, the suction is cut off, so that it is effective only when the door is open.

I claim:

1. In a machine of the class described the combination with a chamber of an opening into said chamber, and a suction-pipe having a long narrow mouth arranged above said opening at the rear thereof.

2. In a machine of the class described the combination with a chamber of an opening into said chamber and a suction-pipe having a long, narrow flaring mouth arranged above said opening at the rear thereof.

3. In a machine of the class described the combination with a chamber of a hopper opening into said chamber, a cover for said hopper, a suction-pipe opening out of said hopper, a damper in the said pipe, a lever connected with said damper and provided with a hook to engage with the said cover.

4. In a machine of the character described, the combination with the feed opening thereof, of a suction device adjacent thereto, and automatic means for limiting the action of the suction device to the period when the powder-feed is open.

5. In a machine of the character described, the combination with the powder-feed, of a suction device adjacent thereto, a closure for the suction device, and means held by the closure when opened to permit the suction device to operate.

6. In a machine of the character described, the combination with a powder-feed, of a closure therefor, a suction device having a long, narrow opening located adjacent to the inner portion of the closure, and means for limiting the action of the suction device to the period when the closure is open.

In testimony whereof, I have signed this specification in the presence of two subscribing witnesses.

FERNLEY H. BANBURY.

Witnesses:
MALCOLM P. NICHOLS,
M. E. HUNTINGTON.